(12) United States Patent
Li et al.

(10) Patent No.: US 10,962,950 B2
(45) Date of Patent: Mar. 30, 2021

(54) METHOD AND APPARATUS FOR CONTROLLING ELECTRIC TOOL, AND ELECTRIC TOOL

(71) Applicant: Positec Power Tools (Suzhou) Co., Ltd., Jiangsu (CN)

(72) Inventors: Zhen Li, Suzhou (CN); Chuanbing Zhang, Suzhou (CN); Dekang Wan, Suzhou (CN)

(73) Assignee: Positec Power Tools (Suzhou) Co., Ltd., Suzhou (CN)

( * ) Notice: Subject to any disclaimer, the term of this patent is extended or adjusted under 35 U.S.C. 154(b) by 38 days.

(21) Appl. No.: 16/229,747

(22) Filed: Dec. 21, 2018

(65) Prior Publication Data

US 2019/0187659 A1 Jun. 20, 2019

Related U.S. Application Data

(63) Continuation of application No. PCT/CN2017/090409, filed on Jun. 27, 2017.

(30) Foreign Application Priority Data

Jun. 27, 2016 (CN) .......................... 201610480495.1

(51) Int. Cl.
*G05B 19/18* (2006.01)
*B23B 45/02* (2006.01)
(Continued)

(52) U.S. Cl.
CPC ............ *G05B 19/182* (2013.01); *B23B 45/02* (2013.01); *B25B 23/147* (2013.01); *G05B 13/04* (2013.01)

(58) Field of Classification Search
CPC .................. G05B 19/182; G05B 13/04; G05B 2219/45127; B25B 23/147; B23B 45/02; B25F 5/00
See application file for complete search history.

(56) References Cited

U.S. PATENT DOCUMENTS 5,539,355 A * 7/1996 Nakamura .......... H04L 27/1525
329/302
2003/0217337 A1 11/2003 Prewett et al.
(Continued)

FOREIGN PATENT DOCUMENTS

CN 1105614 A 7/1995
CN 103481251 A 1/2014
(Continued)

OTHER PUBLICATIONS

Fiume, "An Introduction to Scientific, Symbolic, and Graphical Computation", A K Peters, Ltd., Jan. 15, 1995, p. 146 (Year: 1995).*
(Continued)

*Primary Examiner* — Thomas C Lee
*Assistant Examiner* — Michael Tang
(74) *Attorney, Agent, or Firm* — Middleton Reutlinger

(57) ABSTRACT

The present invention provides a control method and apparatus for an electric tool, and further provides an electronic tool, which relates to the field of automatic control of electric tools. The method comprises: Obtaining parameters characterizing an output shaft load during a running process of an electric tool; calculating the average values of the parameters characterizing an output shaft load according to a composite average algorithm, wherein the composite average algorithm comprises a combination of at least two average algorithms; calculating slope values of the parameters characterizing the output shaft load according to the average values of the parameters characterizing the output shaft load; and interrupting torque output of the electric tool according to the slope values of the parameters characterizing the output shaft load.

18 Claims, 8 Drawing Sheets

(51) Int. Cl.
    *G05B 13/04*     (2006.01)
    *B25B 23/147*     (2006.01)

(56) References Cited

U.S. PATENT DOCUMENTS

| | | | |
|---|---|---|---|
| 2008/0143346 A1* | 6/2008 | Rober | H01F 7/1844 |
| | | | 324/654 |
| 2011/0303427 A1* | 12/2011 | Tang | G05D 17/02 |
| | | | 173/1 |
| 2014/0284070 A1* | 9/2014 | Ng | B25F 5/02 |
| | | | 173/2 |
| 2014/0367134 A1 | 12/2014 | Phillips et al. | |
| 2016/0045694 A1* | 2/2016 | Esmaeil-zadeh-azar | |
| | | | A61B 5/4836 |
| | | | 128/204.23 |
| 2016/0079037 A1* | 3/2016 | Hirano | H01J 37/32165 |
| | | | 156/345.28 |

FOREIGN PATENT DOCUMENTS

| | | | |
|---|---|---|---|
| CN | 104656550 A | * | 5/2015 |
| CN | 105227013 A | | 1/2016 |
| EP | 0659525 A2 | | 6/1995 |
| EP | 2671681 A2 | | 12/2013 |
| JP | 2005231032 A | | 9/2005 |
| JP | 2011189413 A | | 9/2011 |
| JP | 2013202744 A | | 10/2013 |
| JP | 2016027952 A | | 2/2016 |

OTHER PUBLICATIONS

State Intellectual Property Office of the P.R. China, International Search Report and Written Opinion for PCT/CN2017/090409 (English Translation included) dated Sep. 19, 2017.

\* cited by examiner

METHOD AND APPARATUS FOR CONTROLLING ELECTRIC TOOL, AND ELECTRIC TOOL

BACKGROUND

Technical Field

The present invention relates to the field of automatic control of electric tools, and specifically, to a control method and apparatus for an electric tool and further, an electric tool.

Related Art

At present, most of electric tools, for example, a handheld electric drill, have a function of performing intelligent control according to a working condition. An existing handheld electric drill usually has two functions, the first function is to drive an electric motor by electric power to drill a hole, and the second function is to drive an electric motor by electric power to assemble a fastener. Regarding the function of assembling a fastener, a processor inside the electric tool performs an automatic shutdown operation according to a position of the driven fastener, so that the electric tool can shut down automatically when the fastener just reaches a preset position, and an operator does not need to interfere manually.

During actual use, the fastener penetrates through various types of materials and suffers indefinite factors such as variant manual operations, resulting in a complicated actual working condition of the electric motor. A technical solution disclosed in the prior art cannot adapt to different working conditions accurately and shut down at a preset position in any different working condition, causing reduced efficiency of an automatic fastening operation.

SUMMARY

The present invention intends to overcome a defect that the control solution of the electric tool in the prior art has a high misjudgment rate.

In view of this, the present invention provides a control method for an electric tool, and the method further comprises: obtaining parameters characterizing an output shaft load during a running process of an electric tool; calculating the average values of the parameters characterizing an output shaft load according to a composite average algorithm, wherein the composite average algorithm comprises a combination of at least two average algorithms; calculating slope values of currents according to the average values of the parameters characterizing the output shaft load; and interrupting torque output of the electric tool according to the slope values of currents.

Optionally, the composite average algorithm is a combination of an arithmetical average algorithm and a sliding average algorithm.

Optionally, the step of calculating average values of the parameters characterizing the output shaft load according to a composite average algorithm comprises: calculating average parameters of the parameters characterizing the output shaft load by using an arithmetical average algorithm; and calculating average values of the average parameters by using the sliding average algorithm.

Optionally, the step of calculating average values of average parameters by using the sliding average algorithm specifically comprises: iterating calculation of average values of the average parameters for N times by using the sliding average algorithm, wherein N≥2, and a specific iteration operation is to take a result of previous average computation as a data source of next average computation.

Optionally, the step of calculating slope values of the parameters characterizing the output shaft load according to the average values of the parameters characterizing the output shaft load comprises: determining time points corresponding to the average values of two neighboring parameters characterizing the output shaft load; and calculating slope values of the parameters characterizing the output shaft load by using a method of dividing a difference between the average values of the two neighboring parameters characterizing the output shaft load by a difference between the corresponding time points.

Optionally, the step of calculating slope values of the parameters characterizing the output shaft load according to the average values of the parameters characterizing the output shaft load comprises: determining time points corresponding to the average values of two neighboring parameters characterizing the output shaft load; calculating primary slope values of the parameters characterizing the output shaft load by using a method of dividing a difference between the average values of the two neighboring parameters characterizing the output shaft load by a difference between the corresponding time points; and calculating average slope values of the primary slope values by using an average algorithm.

Optionally, the average algorithm performs primary arithmetical average computation.

Optionally, the step of interrupting torque output of the electric tool according to the slope values of the parameters characterizing the output shaft load comprises: determining a slope threshold and a triggering condition according to a load of the electric tool; comparing calculated slope values of N neighboring parameters characterizing the output shaft load with the slope threshold respectively; and determining whether a comparison result meets the triggering condition, and when the comparison result meets the triggering condition, interrupting torque output of the electric tool.

Optionally, when the load of the electric tool is greater than a first load, the slope threshold is a first slope threshold, when the load of the electric tool is less than the first load, the slope threshold is a second slope threshold, and the second slope threshold is less than the first slope threshold.

Optionally, when the load of the electric tool is greater than the first load, the triggering condition is that the slope values of the parameters characterizing the output shaft load calculated at N continuous time points are all greater than the first slope threshold.

Optionally, when the load of the electric tool is less than the first load, the triggering condition is that the slope values of the parameters characterizing the output shaft load calculated at the first M time points among the N continuous time points are all greater than the second slope threshold, and at least a part of the slope values of the parameters characterizing the output shaft load calculated at the latter N-M time points are less than the second slope threshold.

Optionally, the slope thresholds comprise at least three different slope thresholds, and the triggering conditions corresponding to at least a part of the different slope thresholds are not the same.

Correspondingly, the present invention further provides a control apparatus for an electric tool, and the apparatus further comprises: an obtaining unit, configured to obtain parameters characterizing an output shaft load during a running process of an electric tool; an average parameter calculation unit, configured to calculate average values of the parameters characterizing the output shaft load according to a composite average algorithm, wherein the composite average algorithm comprises a combination of at least two average algorithms; a slope value calculation unit, configured to calculate slope values of currents according to the average values of the parameters characterizing the output shaft load; and an execution unit, configured to interrupt torque output of the electric tool according to the slope values of currents.

Optionally, the composite average algorithm is a combination of an arithmetical average algorithm and a sliding average algorithm.

Optionally, the average parameter calculation unit comprises: an arithmetical average calculation unit, configured to calculate average parameters of the parameters characterizing the output shaft load by using an arithmetical average algorithm; and a sliding average calculation unit, configured to calculate average values of average parameters by using a sliding average algorithm.

Optionally, the steps of calculating average values of average parameters by using a sliding average algorithm specifically comprises: iterating calculation of the average values of the average parameters for N times by using the sliding average algorithm, wherein N≥2, and a specific iteration operation is to take a result of previous average computation as a data source of next average computation.

Optionally, the slope value calculation unit comprises: a time determining unit, configured to determine time points corresponding to the average values of two neighboring parameters characterizing the output shaft load; and a difference calculation unit, configured to calculate slope values of the parameters characterizing the output shaft load by using a method of dividing a difference between the average values of the two neighboring parameters characterizing the output shaft load by a difference between two corresponding time points.

Optionally, the slope value calculation unit comprises: a time determining unit, configured to determine time points corresponding to the average values of two neighboring parameters characterizing the output shaft load; a difference calculation unit, configured to calculate primary slope values of the parameters characterizing the output shaft load by using a method of dividing a difference between the average values of the two neighboring parameters characterizing the output shaft load by a difference between the corresponding time points; and an average slope value calculation unit, configured to calculate average slope values of the primary slope values by using the average algorithm.

Optionally, the average algorithm performs primary arithmetical average computation.

Optionally, the execution unit comprises: an execution condition setting unit, configured to determine a slope threshold and a triggering condition according to a load of the electric tool; a slope comparison unit, configured to compare the calculated slope values of the N neighboring parameters characterizing the output shaft load with the slope threshold respectively; a judging unit, configured to determine whether a comparison result meets the triggering condition, and interrupt torque output of the electric tool when the comparison result meets the triggering condition.

Optionally, when the load of the electric tool is greater than a first load, the slope threshold is a first slope threshold, when the load of the electric tool is less than the first load, the slope threshold is a second slope threshold, and the second slope threshold is less than the first slope threshold.

Optionally, when the load of the electric tool is greater than the first load, the triggering condition is that the slope values of the parameters characterizing the output shaft load calculated at N continuous time points are all greater than the first slope threshold.

Optionally, when the load of the electric tool is less than the first load, the triggering condition is that the slope values of the parameters characterizing the output shaft load calculated at the first M time points among N continuous time points are all greater than the second slope threshold, and at least a part of the slope values of the parameters characterizing the output shaft load calculated at the latter N-M time points are less than the second slope threshold.

Optionally, the slope thresholds comprise at least three different slope thresholds, and the triggering conditions corresponding to at least a part of the different slope thresholds are not the same.

The present invention further provides an electric tool, comprising: an electric motor and an output shaft, wherein the electric motor is configured to drive the output shaft to move and the electric tool further comprises: a parameter collection unit, configured to collect parameters characterizing an output shaft load during a running process of the electric motor; and the control apparatus for the above electric tool.

Optionally, the electric tool further comprises: a mode setting apparatus, configured to set working modes of the electric motor; wherein the control apparatus controls the electric motor in a predetermined working mode.

Optionally, the working modes comprise at least a drilling mode and a screwdriver mode, wherein the screwdriver mode is used as the predetermined working mode.

Optionally, the mode setting apparatus comprises: a key unit, configured to receive a user operation; and a mode selection unit, configured to set the working mode of the electric motor according to the user operation. A control method and an apparatus for an electric motor of an electric tool according to an embodiment of the present invention calculate average current values through a composite average algorithm and calculate slope values according to a plurality of average current values. The slope values calculated in this manner can reflect an actual working condition of an electric motor more accurately, and the slope values are used as a judgment basis of torque output and control, thereby reducing a misjudgment rate of a shutdown control and enhancing efficiency of an automatic fastening operation of the electric tool.

The electric tool according to an embodiment of the present invention comprises a current signal collection circuit, configured to collect running currents of an electric motor in real time, and a control apparatus is configured to calculate average current values through a composite average algorithm and calculate slope values according to a plurality of average current values. The slope value calculated in this manner can reflect an actual working condition of the electric motor more accurately, and the slope values are used as a judgment basis of torque output and control, thereby reducing a misjudgment rate of a shutdown control and enhancing efficiency of an automatic fastening operation.

The present invention further provides a control method for an electric tool, comprising: obtaining parameters characterizing an output shaft load during a running process of the electric tool; calculating X-order derivatives of the parameters according to the parameters; calculating average values of the X-order derivatives according to the composite average algorithm, wherein the composite average algorithm comprises a combination of at least two average algorithms; calculating (X+1)-order derivatives of the parameters according to the average values of the X-order derivatives; and interrupting torque output of the electric tool according to the (X+1)-order derivatives, wherein X≥1.

Optionally, the step of calculating X-order derivatives of the parameters according to the parameters comprises: obtaining average values of the parameters according to the composite average algorithm and calculating the X-order derivatives of the parameters according to the average values of the parameters, wherein the composite average algorithm comprises a combination of at least two average algorithms.

Optionally, the step of calculating average values of the parameters according to the composite average algorithm comprises calculating average parameters of the parameters by using an arithmetical average algorithm; and calculating average values of the average parameters by using a sliding average algorithm.

Optionally, X=1, and the step of calculating the X-order derivatives of the parameters according to the average values of the parameters comprises: determining time points corresponding to the average values of two neighboring parameters; calculating primary X-order derivatives of parameters characterizing an output shaft load by using a method of dividing a difference between the average values of the two neighboring parameters by a difference between the corresponding time points; and calculating average values of the primary X-order derivatives by using an average algorithm.

Optionally, the step of calculating average values of the X-order derivatives according to the composite average algorithm comprises: calculating average derivatives of the X-order derivatives by using the arithmetical average algorithm and calculating average values of the average derivatives by using a sliding average algorithm.

Optionally, the step of calculating average values of the average derivatives by using a sliding average algorithm specifically comprises iterating calculation of average values of the average derivatives for N times by using the sliding average algorithm, wherein N≥2, and a specific iteration operation is to take a result of previous average computation as a data source of next average computation.

Optionally, the step of calculating an (X+1)-order derivatives according to the average values of the X-order derivatives comprises: determining time points corresponding to average values of two neighboring X-order derivatives; and calculating (X+1)-order derivatives by using a method of dividing a difference between the average values of the two neighboring X-order derivatives by a difference between corresponding time points.

Optionally, the step of calculating (X+1)-order derivatives according to the X-order derivatives comprises: determining time points corresponding to average values of two neighboring X-order derivatives; calculating primary (X+1)-order derivatives of parameters characterizing an output shaft load by using a method of dividing a difference between the average values of the two neighboring X-order derivatives by a difference between two corresponding time points; and calculating average values of the primary (X+1)-order derivatives by using an average algorithm.

Optionally, the average algorithm is primary arithmetical average computation.

Optionally, the step of interrupting torque output of the electric tool according to the (X+1)-order derivatives comprises: determining a high order derivative threshold and a triggering condition according to the load of the electric tool; comparing the calculated N neighboring (X+1)-order derivatives with the high order derivative threshold respectively; determining whether a comparison result meets the triggering condition, and interrupting torque output of the electric tool when the comparison result meets the triggering condition.

Optionally, when the load of the electric tool is greater than a first load, the high order derivative threshold is a first high order derivative threshold, when the load of the electric tool is less than the first load, the high order derivative threshold is a second high order derivative threshold, and the second high order derivative threshold is less than the first high order derivative threshold.

Optionally, when the load of the electric tool is greater than the first load, the triggering condition is that the (X+1)-order derivatives on the N continuous time points are all greater than the first high order derivative threshold.

Optionally, when the load of the electric tool is less than the first load, the triggering condition is that the (X+1)-order derivatives on the first M time points among the N continuous time points are all greater than the second high order derivative threshold, and at least a part of the (X+1)-order derivatives on the latter N-M time points are less than the second high order derivative threshold.

Optionally, the high order derivative threshold comprises at least three different high order derivative thresholds, and the triggering conditions corresponding to at least a part of different high order derivative threshold are different.

The present invention further provides a control apparatus for an electric tool, and the control apparatus performs the foregoing control method.

The present invention further provides an electric tool, comprising an electric tool and an output shaft, wherein the electric motor is configured to drive the output shaft to move, and the electric tool further comprises: a parameter collection unit, configured to collect parameter characterizing an output shaft load during a running process of the electric motor; and the foregoing control apparatus for the electric tool.

Optionally, the electric tool further comprises: a mode setting apparatus, configured to set working modes of the electric motor. The control apparatus controls the electric motor in a predetermined working mode.

Optionally, the working modes comprise at least a drilling mode and a screwdriver mode, and the predetermined working mode is a screwdriver mode.

Optionally, the mode setting apparatus comprises a key unit, configured to receive a user operation, and a mode selection unit, configure to set a working mode of the electric mode according to the user operation.

BRIEF DESCRIPTION OF THE DRAWINGS

To describe the specific implementations of the present invention or the technical solution of the prior art more clearly, the accompanying drawings required by description of the specific implementations or the prior art are described briefly as follows. Obviously, the accompanying drawings described as follows are some implementations of the present invention, and a person of ordinary skill in the art can further obtain other accompanying drawings according to these accompanying drawings without creative efforts.

DETAILED DESCRIPTION

The technical solutions of various embodiments will be described with reference to the accompanying drawings. Obviously, the described embodiments are only some embodiments, instead of all embodiments, of the present invention. On the basis of the embodiments of the present invention, all other embodiments obtained by a person of ordinary skill in the art without creative efforts fall in the protection scope of the present invention.

Furthermore, the technical features in different implementations of the present invention described as follows can be combined as long as the technical features do not conflict.

Firstly, a first inventive concept of the present invention is described in detail as follows with reference to FIG. 1 to FIG. 7.

Figure 1:
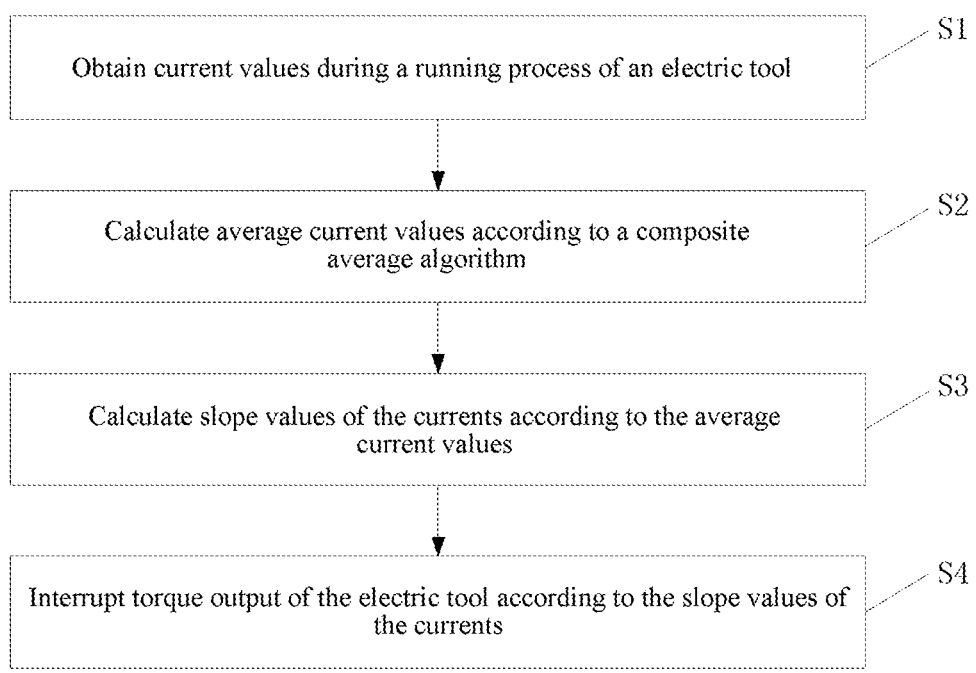
FIG. 1 is a flowchart of a control method for an electric tool according to a first preferred embodiment under a first inventive concept of the present invention.

According to an embodiment under the first inventive concept of the present invention, a control method for an electric motor of an electric tool is provided, and the method may be performed by a processor in the electric tool, and FIG. 1 shows a first preferred embodiment of the control method. In this embodiment, the control method for an electric motor includes the following steps.

S1: Obtain current values during a running process of the electric tool. Besides the current values, voltage values, power values, and so on may also be obtained, and any parameters that can characterize an output shaft load are feasible. The current values are used as an example. A current collection circuit may be used to collect n current values $I_1 \ldots I_n$ when the electric motor of the electric tool rotates to reach a certain time point. Then, the processor obtains the current values. In addition, since an inrush current phenomenon occurs when the electric motor is just turned on, running current values obtained in the solution should be current values collected after the inrush current phenomenon ends. For example, the collection circuit may wait for a while to avoid the inrush current phenomenon, then begin to collect current values, and send the current values to the processor to perform following computation.

S2: Calculate average current values according to a composite average algorithm. The composite average algorithm includes a combination of at least two average algorithms. There are various types of average algorithms, such as an arithmetical average algorithm, a sliding average algorithm, a geometrical average algorithm, a weighing average algorithm and so on. The present invention can use a combination of any two of the plurality of average algorithms to calculate average values. For example, firstly, a certain algorithm is used to calculate average values, secondly, another algorithm is used to calculate average values again based on a calculation result of the first algorithm, and so on, and the average calculation may be performed at least twice. To enhance calculation efficiency, a combination of the arithmetical average algorithm and the sliding average algorithm is preferably used in this embodiment as the foregoing composite average algorithm.

The quantity of current values, the quantity of calculated average current values, and the quantity of times of average calculation used during the foregoing calculation process may be set as required and according to computation capability and data storage capability of the processor and a memory.

S3: Calculate slope values of the currents according to the average current values. That is, calculate a plurality of slope values $K_1 \ldots K_n$ according to the plurality of average current values $\overline{I}_1 \ldots \overline{I}_n$. The slopes may be calculated through a plurality of methods. For example, a linear regression method and a difference method are both feasible. To facilitate following determining, the calculated slope values may be magnified for a predetermined quantity of times.

S4: Interrupt torque output of the electric tool according to the slope values of the currents. Data such as a slope value when a fastener reaches an expected position may be measured through experiments, and a condition for interrupting the torque output is determined according to experimental data. For example, a threshold range or a change trend of the slope value is set according to the experimental data. When the slope value falls in a set threshold range or the change trend meets a predetermined change trend, the electric motor is controlled to stop torque output. A torque may be interrupted by one or more different methods, including, but not limited to, interrupting a power provided for the electric motor, reducing the power provided for the electric motor, braking the electric motor efficiently, or motivating a mechanical clutch disposed between the electric motor and an output mandrel. In an exemplary embodiment, a torque is interrupted by braking the electric motor, thereby setting the fastener at an expected position.

The control method for an electric motor of an electric tool according to an embodiment of the present invention calculates average current values through the composite average algorithm and calculates slope values according to the plurality of average current values. The slope values calculated in this manner can reflect an actual working condition of the electric motor more accurately, and subsequently, the slope values may be used as a judgment basis for controlling torque output, reduce a misjudgment rate of a shutdown control, and enhance efficiency of an automatic fastening operation.

Figure 2:
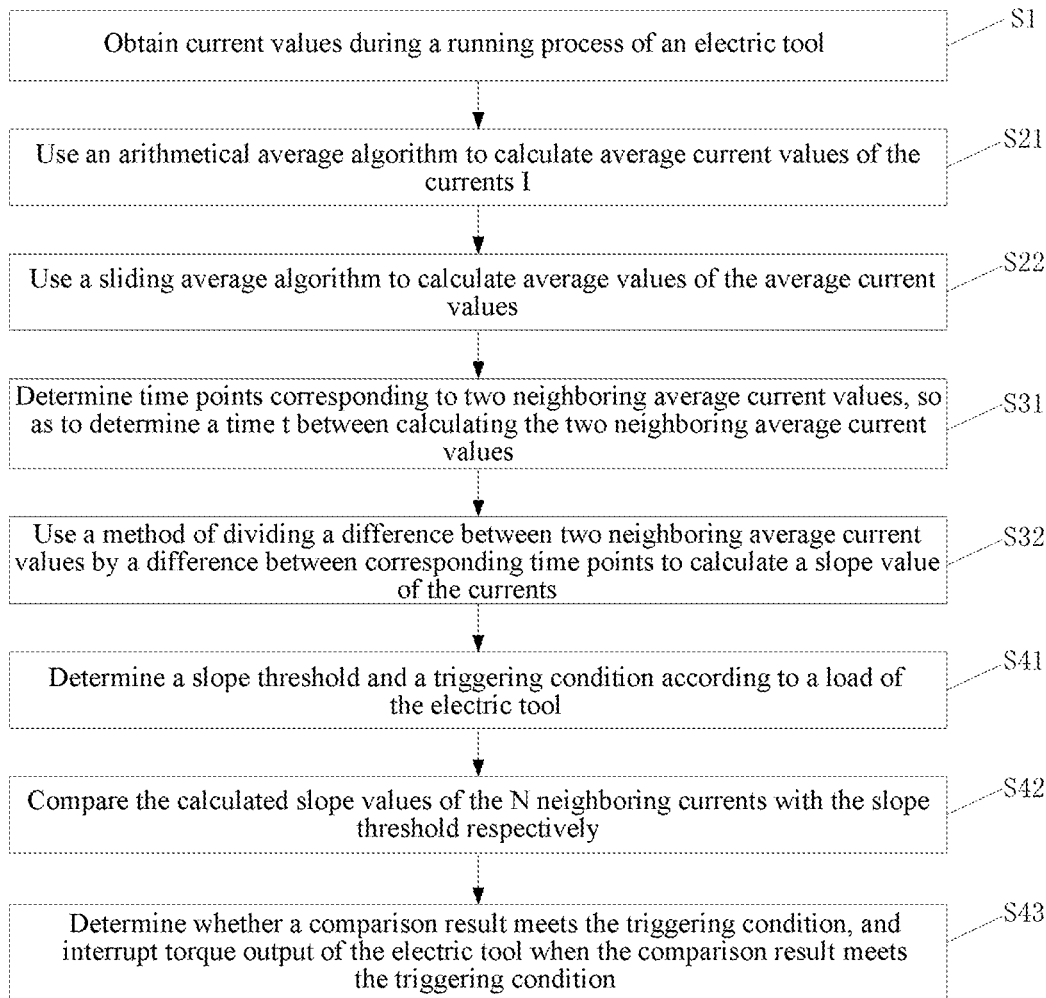
FIG. 2 is a flowchart of a control method for an electric tool according to a second preferred embodiment under the first inventive concept of the present invention.

FIG. 2 is a flowchart of a control method for an electric tool according to a second preferred embodiment under the first inventive concept. This embodiment is different from the first preferred embodiment in that, in this embodiment, a step corresponding to step S2 in the first preferred embodiment may further include the following sub-steps.

S21: Use the arithmetical average algorithm to calculate average current values $\bar{I}$ of the currents I. It is assumed that n actual current values $I_1 \ldots I_n$ during a running process are collected in a certain time period. If an average value is calculated for every three values, several arithmetical average values $\bar{I}_1=(I_1+I_2+I_3)/3$, $\bar{I}_2=(I_4+I_5+I_6)/3$, ..., $\bar{I}_n=(I_{n-1}+I_{n-2}+I_n)/3$ may be obtained. If an average value is calculated for every five values, several arithmetical average values $\bar{I}_1=(I_1+I_2+I_3+I_4+I_5)/5$, $\bar{I}_2=(I_6+I_7+I_8+I_9+I_{10})/5$, ..., and $\bar{I}_n=(I_{n-1}+I_{n-2}+I_{n-3}+I_{n-4}+I_n)/5$ may be obtained.

S22: Use the sliding average algorithm to calculate average values of the average current values $\bar{I}$. That is, the sliding average calculation is performed based on the result of the arithmetical average calculation. If the sliding average calculation is performed for every three average current values $\bar{I}$, several sliding average values $\bar{I}'_1=(\bar{I}_1+\bar{I}_2+\bar{I}_3)/3$, $\bar{I}'_2=(\bar{I}_2+\bar{I}_3+\bar{I}_4)/3$, ..., and $\bar{I}'_n=(\bar{I}_{n-1}+\bar{I}_{n-2}+\bar{I}_n)/3$ may be obtained. If the sliding average calculation is performed for every five average current values $\bar{I}$, several sliding average values $\bar{I}'_1=(\bar{I}_1+\bar{I}_2+\bar{I}_3+\bar{I}_4+\bar{I}_5)/5$, $\bar{I}'_2=(\bar{I}_2+\bar{I}_3+\bar{I}_4+\bar{I}_5+\bar{I}_6)/5$, ..., and $\bar{I}'_n=(\bar{I}_{n-1}+\bar{I}_{n-2}+\bar{I}_{n-3}+\bar{I}_{n-4}+\bar{I}_n)/5$ may be obtained. In other implementations of the present invention, the sliding average algorithm may also be used to calculate average current values firstly, and then the arithmetical average algorithm is used to calculate average values of average current values. That is, the sequence of performing steps S21 and S22 is not limited in the embodiments of the present invention.

The average current values calculated sequentially according to the arithmetical average algorithm and the sliding average algorithm can reflect an actual working condition of the electric motor more accurately and provide more reliable data for a following shutdown control.

Furthermore, to enhance credibility of the current values, the sliding average calculation may be performed a plurality of times in step S22. That is, the sliding average algorithm is used to iterate calculation of average values of the average current values $\bar{I}$ for N times, wherein $N \geq 2$, and the specific iteration operation is to take a result of previous average computation as a data source of next average computation.

Specifically, $\bar{I}_1' \ldots \bar{I}_n'$ obtained in step S22 are results of the first sliding average calculation, and a next iteration calculation is performed depending on the results, so as to obtain second sliding average current values $\bar{I}''_1=(\bar{I}'_1+\bar{I}'_2+\bar{I}'_3+\bar{I}'_4+\bar{I}'_5)/5$, $\bar{I}''_2=(\bar{I}'_2+\bar{I}'_3+\bar{I}'_4+\bar{I}'_5+\bar{I}'_6)/5$, ..., and $\bar{I}''_n=(\bar{I}'_{n-1}+\bar{I}'_{n-2}+\bar{I}'_{n-3}+\bar{I}'_{n-4}+\bar{I}'_n)/5$. In a similar way, on the basis of this, the third sliding average calculation may also be performed to obtain $\bar{I}'''_1=(\bar{I}''_1+\bar{I}''_2+\bar{I}''_3+\bar{I}''_4+\bar{I}''_5)/5$, $\bar{I}'''_2=(\bar{I}''_2+\bar{I}''_3+\bar{I}''_4+\bar{I}''_5+\bar{I}''_6)/5$, ..., and $\bar{I}'''_n=(\bar{I}''_{n-1}+\bar{I}''_{n-2}+\bar{I}''_{n-3}+\bar{I}''_{n-4}+\bar{I}''_n)/5$. The actual quantity of iteration times may be considered with reference to an actual fluctuation condition of currents and computation costs. In this embodiment, N=3, that is, iteration is performed three times to obtain finally required average current values $\bar{I}'''_1 \ldots \bar{I}'''_n$.

If the value of N is 2, iteration is performed twice, that is, $\bar{I}''_1 \ldots \bar{I}''_n$ are taken as final results.

This embodiment is further different from the first preferred embodiment in that, in this embodiment, a step corresponding to step S3 in the first preferred embodiment further includes the following sub-steps.

S31: Determine time points corresponding to two neighboring average current values, so as to determine a time t between calculating the two neighboring average current values.

S32: Use a method of dividing a difference between two neighboring average current values by a difference between corresponding time points to calculate a slope value of the currents. That is, the slope value $K_i=(\bar{I}'''_i-\bar{I}'''_{i-1})/t$, and t represents a time between calculating $\bar{I}'''_i$ and calculating $\bar{I}'''_{i-1}$.

Figure 3:
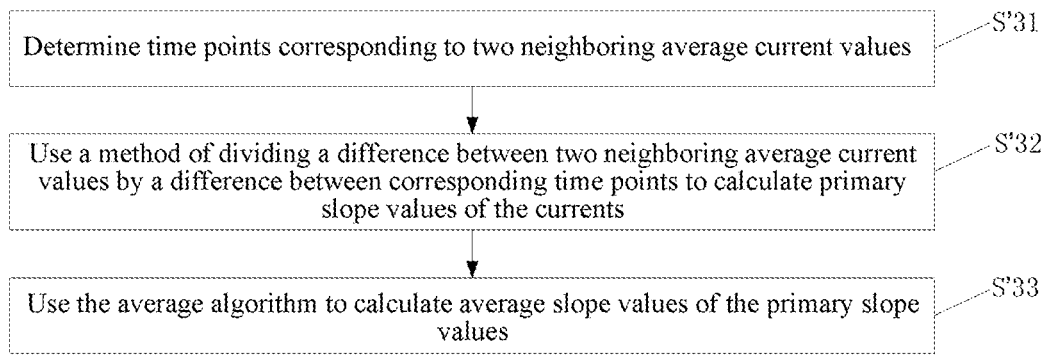
FIG. 3 is a preferred flowchart of calculating a slope value according to an embodiment under the first inventive concept of the present invention.

More preferably, the slope value may also be calculated by using a mean algorithm. FIG. 3 is another preferred flowchart of calculating a slope value. That is, a step corresponding to step S3 in the first preferred embodiment may further include the following sub-steps.

S'31: Determine time points corresponding to two neighboring average current values.

S'32: Use a method of dividing a difference between two neighboring average current values by a difference between corresponding time points to calculate primary slope values of the currents. Step S'31 and step S'32 are the same as step S31 and step S32, and after a period of time, a plurality of slope values $k_1 \ldots k_n$ may be calculated.

S'33: Use the average algorithm to calculate average slope values of the primary slope values. For example, if an average value is calculated for every five values, $\bar{K}=(k_i+ \ldots +k_{i+4})/5$, and furthermore, if an average value is calculated for every three values, $\bar{K}=(k_i+ \ldots +k_{i+2})/3$.

The foregoing preferred solution uses slope values calculated at a plurality of time points to perform average computation to obtain finally required slope values, and the average slope values are closer to an actual working condition and can enhance accuracy of a following shut-down control operation. To enhance the computation efficiency, during the foregoing process of calculating average slope values, this embodiment preferably performs primary arithmetical average computation.

In this embodiment, a step corresponding to step S4 in the first preferred embodiment may include the following sub-steps.

S41: Determine a slope threshold and a triggering condition according to a load of the electric tool. The load may be a current power value or current value of the electric motor or another value of a parameter reflecting an output shaft load, or a current value calculated in the foregoing step. For example, the average current value at a certain time calculated in step S21 or step S22 is $\bar{I}_j$, and according to $\bar{I}_j$, a slope threshold may be determined specifically through a table look-up manner, that is, a slope threshold comparison table is preset, different average current value ranges correspond to different slope thresholds, and then, a most suitable slope threshold may be determined according to an actual working condition, so as to modify a value of a counter more accurately, be closer to the actual working condition, and then further enhance efficiency of a shut-down control.

The triggering condition in this embodiment is a condition related to the slope value. A person skilled in the art can understand that, the triggering condition of the electric tool usually is not a simple threshold comparison result obtained by one comparison, but a series of comparison results obtained by a plurality of continuous comparisons. Furthermore, for a different working condition, the triggering condition is also different. Therefore, there is a plurality of types of triggering conditions in the art, and the triggering condition, similar to the slope threshold, may also be determined according to a current load condition.

Furthermore, when the load of the electric tool is greater than the first load, the slope threshold is determined as the first slope threshold, and when the load of the electric tool is less than the first load, the slope threshold is determined as the second slope threshold. The second slope threshold is less than the first slope threshold. That is, when the load is large, the slope threshold is large, and when the load is small, the slope threshold is small.

Furthermore, when the load of the electric tool is greater than the first load, the triggering condition is that the slope values of the currents calculated at the N continuous time points are all greater than the first slope threshold. For example, the slope values $\overline{K}$ calculated at the five time points i ms, (i+25) ms, (i+50) ms, (i+75) ms, (i+100) ms are all greater than the slope threshold, and then torque output is interrupted.

When the load of the electric tool is less than the first load, the triggering condition is that the slope values of the currents calculated at the first M time points among the N continuous time points are all greater than the second slope threshold, and at least a part of the slope values of the currents calculated at the latter N-M time points are less than the second slope threshold. For example, the slope values $\overline{K}$ calculated at the three time points i ms, (i+25) ms, and (i+75) ms are all greater than the slope threshold, and the slope values $\overline{K}$ calculated at the two time points (i+100) ms and (i+125) ms are both less than the slope threshold, and then, torque output is interrupted.

In the preferred solution, different slope thresholds and shutdown triggering conditions are set for different working conditions, so as to adapt to different working environments, thereby enhancing accuracy and efficiency of an automatic control operation.

Preferably, the slope thresholds include at least three different slope thresholds, and the triggering conditions corresponding to at least a part of different slope thresholds are different. For example, three different slope thresholds are $K_x$, $K_y$, and $K_z$, $K_x$ may correspond to a first triggering condition, and $K_y$ and $K_z$ correspond to a second triggering condition. More preferably, three to nine different slope thresholds are set according to different working conditions. When nine different slope thresholds $K_1$-$K_9$ are set according to the load, $K_1$ and $K_2$ correspond to the same triggering condition, $K_3$-$K_5$ correspond to the same triggering condition, and $K_6$, $K_7$, $K_8$, and $K_9$ correspond to different triggering conditions respectively. Of course, other corresponding relations are also possible and will not be listed one by one herein.

S42: Compare the calculated slope values of the N neighboring currents with the slope threshold respectively. For example, $\overline{K}$=40 at the $i^{th}$ ms after the electric motor begins to run, $\overline{K}$=50 at the $(i+25)^{th}$ ms, $\overline{K}$=60 at the $(i+50)^{th}$ ms, $\overline{K}$=65 at the $(i+75)^{th}$ ms, and $\overline{K}$=70 at the $(i+100)^{th}$ ms, and relations between $\overline{K}$ and the slope threshold are determined respectively at the five time points, i ms, (i+25) ms, (i+50) ms, (i+75) ms, and (i+100) ms. According to the plurality of $\overline{K}$, it can be known that, the cycle for calculating the slope value in this embodiment is 25 ms, that is, an average slope value is calculated every 25 ms, and in other preferred manners, the calculation cycle may be set according to hardware performance and actual demand. For example, 10 ms, 50 ms, or a shorter or longer calculation cycle is feasible, and the calculation cycle is not limited in the present invention.

S43: Determine whether a comparison result meets the triggering condition, and interrupt the torque output of the electric tool when the comparison result meets the triggering condition. After the slope threshold is determined, in a series of comparisons as described above, the slope values at some time points may be possibly greater than the slope threshold, the slope values at other time points may be possibly less than the slope threshold, and the series of comparison results may form a comparison result change trend of slopes and thresholds, and if the change trend meets the shut-down condition determined before, torque output is interrupted.

In a specific embodiment, a counter may be used to measure the change trend of a relation between slope values and thresholds. Specifically, after the slope values are compared with the threshold, the value of the counter may be modified according to the comparison results, that is, the value of the counter is increased or reduced, and at the same time, the values of the counter at the foregoing five time points are recorded respectively.

It is assumed that $\overline{K}$=40 at the $i^{th}$ ms, $\overline{K}$=50 at the $(i+25)^{th}$ ms, $\overline{K}$=60 at the $(i+50)^{th}$ ms, $\overline{K}$=65 at the $(i+75)^{th}$ ms, and $\overline{K}$=70 at the $(i+100)^{th}$ ms, the slope threshold is 50, the initial value of the counter is 0, and the modification rule is to add 1 when the slope value is greater than 50, subtract 1 when the slope value is less than 50, and when the value of the counter is 0, no subtraction is performed. The values of the counter at the foregoing five time points are sequentially 0, 1, 2, 3, and 4, and it can be learned that the value of the counter is increased continuously, and the change trend of the value of the counter may serve as the foregoing triggering condition.

Figure 4:
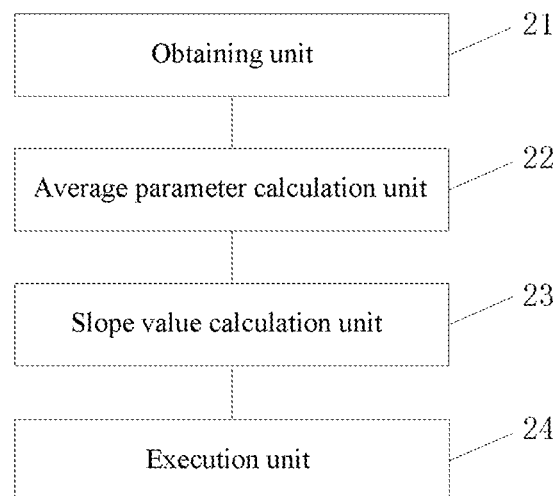
FIG. 4 is a schematic structural diagram of a control apparatus for an electric tool according to an embodiment under the first inventive concept of the present invention.

Another embodiment under the first inventive concept of the present invention further provides an apparatus for controlling an electric motor of an electric tool, and as shown in FIG. 4, the apparatus includes:

an obtaining unit 21, configured to obtain parameters characterizing an output shaft load during a running process of the electric tool, the parameters possibly being current values;

an average parameter calculation unit 22, configured to calculate average current values according to a composite average algorithm, the composite average algorithm including a combination of at least two average algorithms;

a slope value calculation unit 23, configured to calculate slope values of the currents according to the average current values; and an execution unit 24, configured to interrupt torque output of the electric tool according to the slope values of the currents.

The control apparatus for an electric motor of an electric tool according to an embodiment of the present invention calculates average current values through the composite average algorithm, and calculates slope values according to the plurality of average current values. The calculated slope values can reflect the actual working condition of the electric motor more accurately, and may be used as a judgment basis for controlling torque output subsequently, thereby reducing a misjudgment rate of a shutdown control and enhancing efficiency of an automatic fastening operation.

Preferably, the composite average algorithm used by the average parameter calculation unit 22 of the apparatus is a combination of an arithmetical average algorithm and a sliding average algorithm.

Preferably, the average parameter calculation unit 22 may include:

an arithmetical average calculation unit, configured to use the arithmetical average algorithm to calculate average currents $\overline{I}$ of the currents I; and a sliding average calculation unit, configured to use the sliding average algorithm to calculate average values of the average currents $\overline{I}$.

The average current values calculated sequentially according to the arithmetical average algorithm and the sliding average algorithm in the preferred solution can reflect the actual working condition of the electric motor more accurately, and provide more reliable data for a following shutdown control.

Furthermore, to enhance the credibility of the current values, the sliding average calculation unit uses the sliding average algorithm to iterate calculation of average values of the average current values Ī for N times, wherein N≥2, and the specific iteration operation is to take a result of previous average computation as a data source of next average computation.

In a preferred implementation, the slope value calculation unit 23 may include:

a time determining unit, configured to determine time points corresponding to two neighboring average current values; and a difference calculation unit, configured to use a method of dividing a difference between two neighboring average current values by a difference between corresponding time points to calculate slope values of the currents.

In another preferred implementation, the slope value calculation unit 23 may include:

a time determining unit, configured to determine time points corresponding to two neighboring average current values;

a difference calculation unit, configured to use a method of dividing a difference between two neighboring average current values by a difference between corresponding time points to calculate primary slope values of the currents; and an average slope value calculation unit, configured to use the average algorithm to calculate slope values of the currents according to the primary slope values of the plurality of neighboring time points.

Furthermore, the average algorithm used by the average slope value calculation unit preferably performs primary arithmetical average computation.

In another preferred implementation, the execution unit 24 may include:

an execution condition setting unit, configured to determine a slope threshold and a triggering condition according to the load of the electric tool;

a slope comparison unit, configured to compare the calculated slope values of the N neighboring currents with the slope threshold respectively; and a judging unit, configured to determine whether a comparison result meets the triggering condition, and interrupt the torque output of the electric tool when the comparison result meets the triggering condition.

Furthermore, when a load of the electric tool is greater than a first load, the slope threshold is a first slope threshold, when the load of the electric tool is less than a first load, the slope threshold is a second slope threshold, and the second slope threshold is less than the first slope threshold.

When the load of the electric tool is greater than the first load, the triggering condition is that the slope values of the currents calculated at the N continuous time points are all greater than the first slope threshold.

When the load of the electric tool is less than the first load, the triggering condition is that the slope values of the currents calculated at the first M time points among the N continuous time points are all greater than the second slope threshold, and at least a part of the slope values of the currents calculated at the latter N-M time points are less than the second slope threshold.

Preferably, the slope thresholds include at least three different slope thresholds, and the triggering conditions corresponding to at least a part of different slope thresholds are different.

Figure 5:
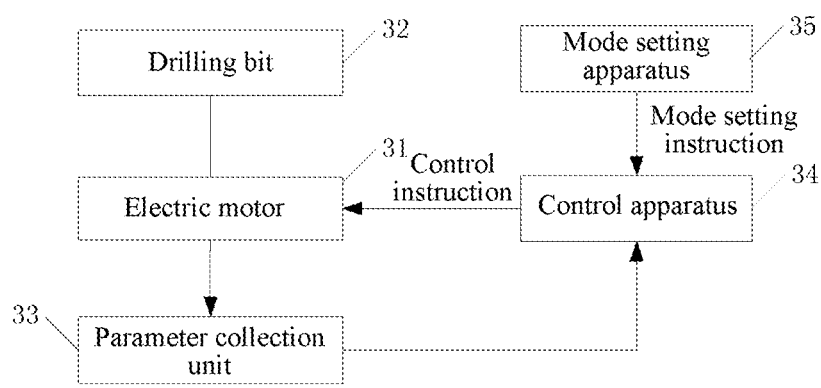
FIG. 5 is a schematic structure diagram of a circuit structure of an electric tool according to an embodiment under the first inventive concept of the present invention.

Another embodiment under the first inventive concept of the present invention further provides an electric tool, and as shown in FIG. 5, the tool includes an electric motor 31, a drilling bit 32, a parameter collection unit 33, and the control apparatus 34 for an electric tool provided in the foregoing embodiments. The electric motor 31 is configured to drive the drilling bit 32 to rotate. The parameter collection unit 33 is configured to collect parameters of the electric motor 31 characterizing an output shaft load, and with reference to the foregoing embodiments, the parameters may be current values. The control apparatus 34 for an electric tool may obtain current values collected by the parameter collection unit 33, and perform a control operation as described in the foregoing embodiments on the electric motor.

For example, when the control apparatus 34 determines and calculates the current values collected by parameter collection unit 33, as described in the foregoing embodiments, and determines that an interruption condition is met, the control apparatus 34 may send a control instruction for interrupting torque output to the electric motor 31, so as to make the electric motor 31 stop rotation.

Figure 6:
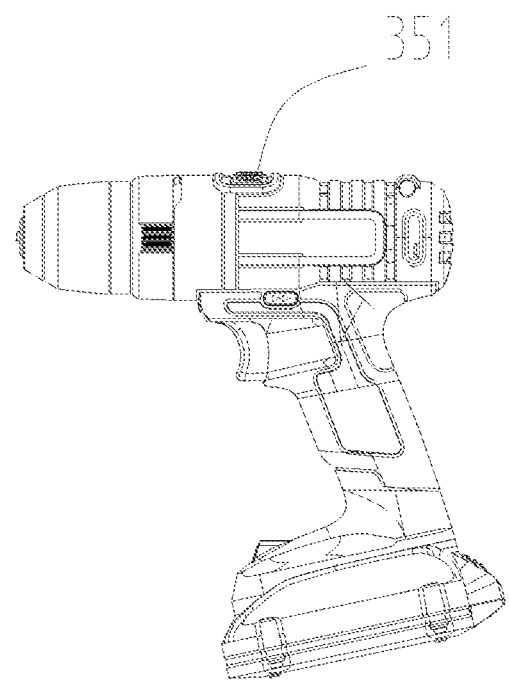
FIG. 6 is a front view of the appearance and structure of an electric tool according to an embodiment under the first inventive concept of the present invention.
Figure 7:
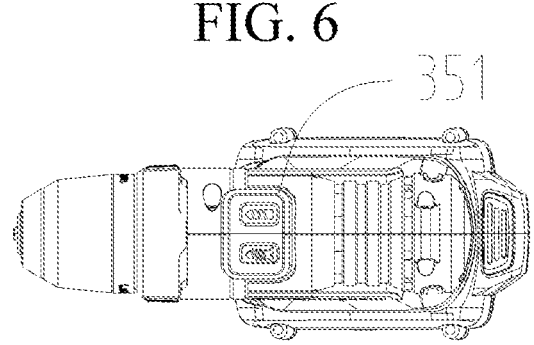
FIG. 7 is a top view of the appearance and structure of an electric tool according to an embodiment under the first inventive concept of the present invention.

The control apparatus 34 may be a central processing unit (CPU), a microcontroller, a field-programmable gate array (FPGA), and so on. The members may be disposed in a housing of the electric tool as shown in FIG. 6 and FIG. 7.

To avoid an inrush current phenomenon, the parameter collection unit 33 may monitor whether the electric motor 31 is started and collect running current values of the electric motor 31 continuously after waiting for a predetermined time period when the electric motor 31 is started.

Regarding the electric tool according to an embodiment of the present invention, the current signal collection circuit may collect running currents of the electric motor in real time, and the control apparatus calculates average current values through the composite average algorithm, and calculates slope values according to the plurality of average current values. Thus, the calculated slope values can reflect an actual working condition of the electric motor more accurately, and subsequently, the slope values may be used as a judgment basis for controlling torque output of the electric motor, reduce a misjudgment rate of a shutdown control, and enhance efficiency of an automatic fastening operation.

In a preferred implementation, the electric tool may further include:

a mode setting apparatus 35, configured to set a working mode of the electric motor 31. The control apparatus 34 controls the electric motor in a predetermined working mode, and the mode setting apparatus 35 sets a working mode of the electric motor 31 through the control apparatus 34.

Furthermore, the foregoing working modes include at least a drilling mode and a screwdriver mode, and in this embodiment, the screwdriver mode is used as the predetermined working mode.

Preferably, the mode setting apparatus 35 may include a key unit 351 configured to receive a user operation and a mode selection unit configured to set the working mode of the electric motor according to the user operation. The key unit 351 may be disposed at a position shown in FIG. 6 and FIG. 7, so that a user can operate conveniently. In this embodiment, the key unit 351 has two keys respectively corresponding to the drilling mode and the screwdriver mode. The mode selection unit may be set inside the housing, the two keys may send an electric signal to the mode selection unit respectively, and according to the received electric signal, the mode selection unit sends a mode setting instruction to the electric motor 31 to set a working mode of the electric motor 31.

An embodiment under the second concept of the present invention is described in detail as follows with reference to FIG. 8 to FIG. 11.

Figure 8:
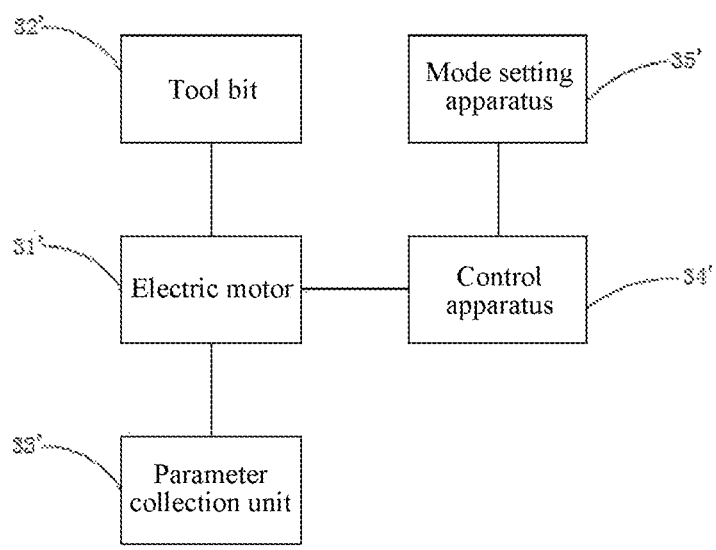
FIG. 8 is a structural schematic diagram of a control apparatus for an electric tool according to an embodiment under a second inventive concept of the present invention.

FIG. 8 shows a first preferred embodiment of the electric tool under the concept of the present invention. The electric tool includes an electric motor 31', a tool bit 32', a parameter collection unit 33', and a control apparatus 34'. The parameter collection unit 33' is configured to collect parameters related to the electric motor 31', so as to obtain parameters characterizing an output shaft load, for example, a rotation speed of the electric motor, a current flowing through the electric motor, voltages at two ends of the electric motor, and efficiency of the electric motor. Of course, other parameters may also be collected to obtain parameters characterizing the output shaft load, for example, a rotation speed of an output shaft and a torsion of the output shaft. The parameters are also applicable to each embodiment under the first inventive concept. For example, a parameter collected by the parameter collection unit 33' is a current flowing through the electric motor 31, and this embodiment is described in detail. The control apparatus 34' for an electric tool receives a current value transmitted by the parameter collection unit 33', and performs a control method of the present invention, so as to interrupt a torque output of the electric tool at a suitable time point, so as to shut down the electric tool at a preset position accurately in a different working condition, and enhance the efficiency of the automatic fastening operation.

Optionally, the electric tool may further include: a mode setting apparatus 35', configured to set a working mode of the electric tool. The control apparatus 34' performs a different control method in a different working mode, and performs the control method provided in the present invention only in the predetermined working mode. The mode setting apparatus 35' may set a working mode of the electric tool through the control apparatus 34'. Optionally, the working modes include at least a drilling mode and a screwdriver mode. When the control apparatus 34' in this embodiment determines that a mode set by a user is a screwdriver mode according to a signal of the mode setting apparatus 35', the control method of the present invention is performed.

In an optional embodiment, the mode setting apparatus 35' includes: a key unit 351, configured to receive a user operation and a mode selection unit, configured to set a working mode of the electric tool according to the user operation. The key unit 351 may be disposed at a position shown in FIG. 6 and FIG. 7, so that a user can operate conveniently. In this embodiment, the key unit 351 has two keys respectively corresponding to the drilling mode and the screwdriver mode. The mode selection unit may be set inside the housing, the two keys may send an electric signal to the mode selection unit respectively, and according to the received electric signal, the mode selection unit sends a mode setting instruction to the control apparatus 34' to set a working mode of the electric tool.

The control method performed by the control apparatus 34' is described in detail with reference to FIG. 9 to FIG. 11.

Figure 9:
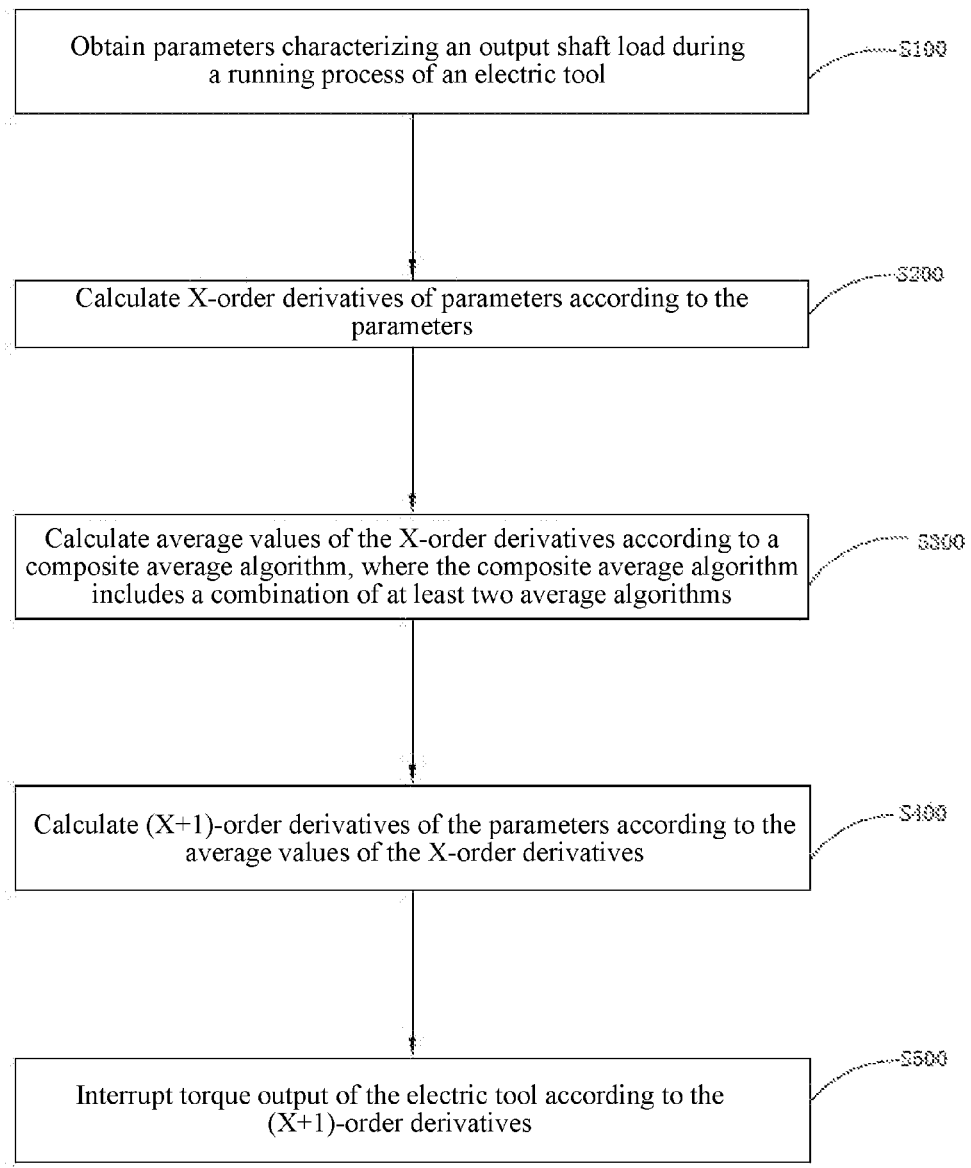
FIG. 9 is a flowchart of a control method for an electric tool according to a first preferred embodiment under the second inventive concept of the present invention.

FIG. 9 shows the first preferred embodiment of the control method under the concept of the present invention, including the following steps.

S100: Obtain parameters characterizing an output shaft load during a running process of the electric tool. In this embodiment, the current is used as an example. Besides the current, a voltage value, a power value, and so on may also be obtained, and any parameter that may characterize an output shaft load is feasible. A parameter collection circuit 33' is used to collect current values $I_1 \ldots I_n$ during a running process of the electric tool and then transmit the current values to the control apparatus 34'. In addition, since an inrush current phenomenon occurs when the electric motor is just turned on, running current values obtained by the control apparatus 34' in this solution should be current values collected after the inrush current phenomenon ends. For example, the control apparatus 34' may receive the signals transmitted by the parameter collection unit 33' all the time, but must wait for a while before processing data, so as to avoid the inrush current.

S200: Calculate X-order derivatives of parameters according to the parameters, wherein X☐1. Many methods, such as a linear regression method, a difference method, a frequency division amplitude modulation method and so on, are used to calculate X-order derivatives of currents.

A first-order derivative is used as an example to describe the linear regression method. In a current distribution diagram obtained by the control apparatus 34', a best fitted line of scatter plot data is defined by an equation y=a+bx, and herein, a slope of the best fitted line may be determined as $b=(\Sigma xy-(\Sigma x \Sigma y)/n)/(\Sigma x^2-(\Sigma x)^2/n)$, n represents the quantity of data plots, y represents a current value, and an intercept is omitted. Based on the foregoing formula, b is obtained, so that di/dt=b, thereby calculating the first-order derivative. When this method is used to calculate an X-order derivative, X is replaced with an (X−1)-order derivative.

A first-order derivative is used as an example to describe the difference method. The first-order derivative is represented as di/dt, and $di/dt=(i_n-i_{n-1})/(t_n-t_{n-1})$, that is, dividing a difference between current values at two neighboring time points by a difference between two time points. The currents at the two neighboring time points may be values collected in real time or calculated average values. When this method is used to calculate an X-order derivative, i is replaced with an (X−1)-order derivative.

A first-order derivative is used as an example to describe the frequency division amplitude modulation method. The method for obtaining a first-order derivative through a frequency division amplitude modulation is the same as the method for obtaining a slope under the first inventive concept, will not be described in detail herein, and is only briefly described as follows.

Step 1: Obtain current values during a running process of the electric tool. Step 2: Calculate average current values according to the composite average algorithm. Step 3: Calculate slope values of the currents according to the average current values. Optionally, the slope values of the currents calculated according to the average current values may be original slope values obtained according to calculation, that is, primary slope values in the foregoing embodiments, or may be average slope values obtained after the average algorithm is performed on the primary slope values. When this method is used to calculate the X-order derivative, i is replaced as an (X−1)-order derivative.

S300: Calculate average values of the X-order derivatives according to the composite average algorithm. The composite average algorithm includes a combination of at least two average algorithms. There are various types of average algorithms, for example, an arithmetical average algorithm, a sliding average algorithm, a geometrical average algorithm, and a weighing average algorithm. The present invention can use a combination of any two of the plurality of average algorithms to calculate the average values. For example, firstly, a certain algorithm is used to calculate average values, secondly, another algorithm is used to calculate average values again based on a calculation result of the first algorithm, and so on, and the average calculation may be performed at least twice. To enhance calculation efficiency, a combination of the arithmetical average algorithm and the sliding average algorithm is preferably used in this embodiment as the composite average algorithm.

The quantity of X-order derivatives obtained during the foregoing calculation process, the quantity of average values of calculated X-order derivatives, and the quantity of times of average calculation may be set as required and according to computation capability and data storage capability of a processor and a memory.

S400: Calculate (X+1)-order derivatives of the parameters according to the average values of the X-order derivatives. That is, calculate a plurality of (X+1)-order derivatives $d^{n+1}i/dt_1 \ldots d^{n+1}i/dt_n$ according to the average values $\overline{d^n i}/dt_1 \ldots \overline{d^n i}/dt_n$ of the plurality of X-order derivatives. The (X+1)-order derivatives may be calculated through many methods. For example, the linear regression method and the difference method are both feasible. To facilitate following judgment, the calculated (X+1)-order derivatives may be magnified a predetermined quantity of times.

S500: Interrupt torque output of the electric tool according to the (X+1)-order derivatives. Data such as (X+1)-order derivatives when the fastener reaches a predetermined position may be measured through experiments, and a condition for interrupting torque output is determined according to experimental data. For example, according to the experimental data, a threshold range is set, or a change trend of the (X+1)-order derivatives is set. When the (X+1)-order derivatives reach the set threshold range or the change trend meets a predetermined change trend, the electric motor is controlled to stop torque output. The torque may be interrupted by one or more methods, including, but not limited to, interrupting the power for the electric motor, reducing the power for the electric motor, outputting a current to the electric motor intermittently, braking the electric motor efficiently or motivating a mechanical clutch disposed between the electric motor and the output mandrel. In an exemplary embodiment, the torque is interrupted by braking the electric motor, thereby setting the fastener at an expected position.

The control method for an electric tool according to an embodiment of the present invention calculates and obtains average values of X-order derivatives through the composite average algorithm, and calculates the (X+1)-order derivatives according to the average values of the plurality of X-order derivatives, and the calculated (X+1)-order derivatives can reflect the actual working condition of the electric tool more accurately, and then the values of the (X+1)-order derivatives are taken as a judgment basis for controlling torque output, thereby reducing a misjudgment rate of controlling to interrupt torque output and enhancing efficiency of an automatic fastening operation.

Figure 10:
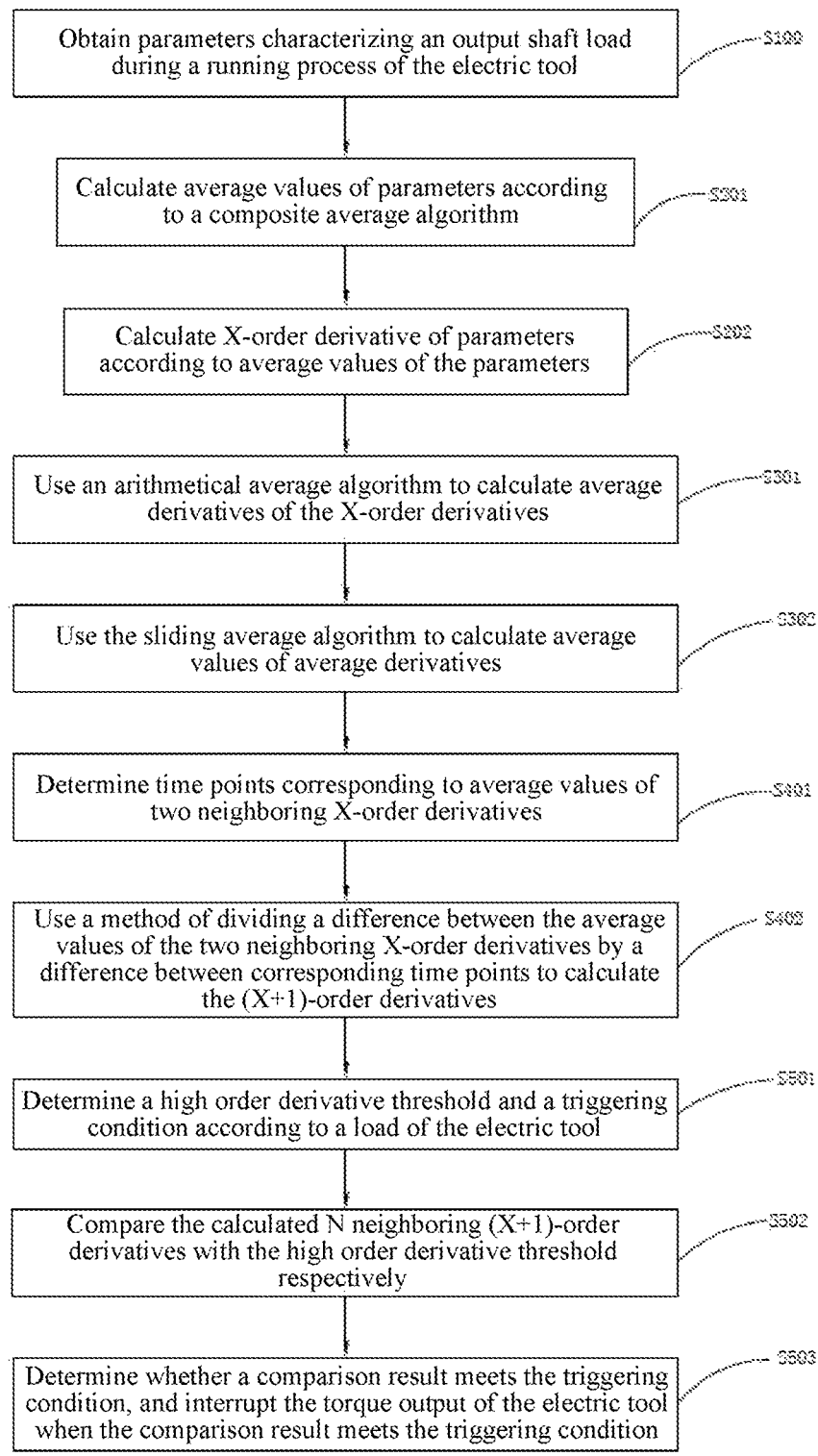
FIG. 10 is a flowchart of a control method for an electric tool according to a second preferred embodiment under the second inventive concept of the present invention.

FIG. 10 is a flowchart of a method for controlling a second preferred electric tool under the concept of the present invention. This embodiment differs from the first preferred embodiment under the concept of the present invention is that, in this embodiment, a step corresponding to step S200 in the first preferred embodiment may further include the following sub-steps.

S201: Calculate average values of parameters according to the composite average algorithm.

S202: Calculate X-order derivative of parameters according to average values of the parameters.

When X=1, the specific content of steps S201 and S202 may be obtained with reference to the foregoing steps S2, S3, S21, S22, S31, and S32. Details are not described herein again. When X>1, the specific content of steps S201 and S202 may also be obtained with reference to the foregoing steps S2, S3, S21, S22, S31, and S32, except that the parameter i is replaced as a value of the (X−1)-order derivative.

In an embodiment shown in FIG. 10, a step corresponding to step S300 in the first preferred embodiment may further include the following sub-steps.

S301: Use an arithmetical average algorithm to calculate average derivatives $\overline{d^n i}/dt$ of the X-order derivatives $d^n i/dt$. In this embodiment, the $d^n i/dt$ is $di/dt$ when X=1, and $di/dt$ is replaced as a corresponding $d^n i/dt$ when X>1, and details are not described herein again. It is assumed that n $di/dt_1 \ldots di/dt_n$ are obtained according to step S200 in a certain period of time. If one average value is calculated for every three values, several arithmetical average values
$\overline{di}/dt_1 = (di/dt_1 + di/dt_2 + di/dt_3)/3$,
$\overline{di}/dt_2 = (di/dt_4 + di/dt_5 + di/dt_6)/3$, . . . , and
$\overline{di}/dt_n = (di/dt_{n-1} + di/dt_{n-2} + di/dt_n)/3$ may be obtained. If one average value is calculated for every five values, several arithmetical average values
$\overline{di}/dt_1 = (di/dt_1 + di/dt_2 + di/dt_3 + di/dt_4 + di/dt_5)/5$,
$\overline{di}/dt_2 = (di/dt_6 + di/dt_7 + di/dt_8 + di/dt_9 + di/dt_{10})/5$, . . . ,
$\overline{di}/dt_n = (di/dt_{n-1} + di/dt_{n-2} + di/dt_{n-3} + di/dt_{n-4} + di/dt_n)/5$ may be obtained. Herein, it should be noted that, n $di/dt_1 \ldots di/dt_n$ that used as a data source in this step are obtained in step S200. When $di/dt$ is obtained through a frequency division amplitude modulation method in step S200, the $di/dt$ may be an original slope value obtained through calculating according to the currents, that is, the primary slope value in the foregoing embodiment, and the $di/dt$ may also be an average slope value obtained after the average algorithm is performed on the primary slope value.

S302: Use the sliding average algorithm to calculate average values of average derivatives $\overline{di}/dt$. That is, perform a sliding average calculation according to the result of the arithmetical average calculation. If the sliding average calculation is performed for every three average derivatives $\overline{di}/dt$, several sliding average values $\overline{di}/dt'_1 = (\overline{di}/dt_1 + \overline{di}/dt_2 + \overline{di}/dt_3)/3$, $\overline{di}/dt'_2 = (\overline{di}/dt_2 + \overline{di}/dt_3 + \overline{di}/dt_4)/3$, . . . , $\overline{di}/dt'_n = (\overline{di}/dt_{n-1} + \overline{di}/dt_{n-2} + \overline{di}/dt_n)/3$ may be obtained. If the sliding average calculation is performed for every five average derivatives $\overline{di}/dt$, several sliding average values $\overline{di}/dt'_1 = (\overline{di}/dt_1 + \overline{di}/dt_2 + \overline{di}/dt_3 + \overline{di}/dt_4 + \overline{di}/dt_5)/5$, $\overline{di}/dt'_2 = (\overline{di}/dt_2 + \overline{di}/dt_3 + \overline{di}/dt_4 + \overline{di}/dt_5 + \overline{di}/dt_6)/5$, . . . , $\overline{di}/dt'_n = (\overline{di}/dt_{n-1} + \overline{di}/dt_{n-2} + \overline{di}/dt_{n-3} + \overline{di}/dt_{n-4} + \overline{di}/dt_n)/5$ may be obtained. In other implementations of the present invention, the sliding average algorithm may also be used to calculate average derivatives firstly, and then the arithmetical average algorithm is used to calculate average values of the average derivatives. That is, the sequence of performing steps S301 and S302 is not limited in the embodiments of the present invention.

The average derivatives calculated according to the arithmetical average algorithm and the sliding average algorithm can reflect an actual working condition of the electric tool more accurately, and provide more reliable data for a following control of interrupting torque output.

Furthermore, to enhance the credibility of values of X-order derivatives, the sliding average calculation may be performed many times in step S302, that is, the sliding average algorithm is used to iterate calculation of average values of the average derivatives $\overline{di}/dt$ for N times, wherein N≥2, and the specific iteration operation is to take a result of previous average computation as a data source of next average computation.

Specifically, $\overline{di}/dt_1' \ldots \overline{di}/dt_n'$ obtained in step S302 are results obtained by the first sliding average calculation, and then the next iteration calculation is performed based on the results to obtain the second sliding average derivative values $\overline{di/dt''}_1=(\overline{di/dt'}_1+\overline{di/dt'}_2+\overline{di/dt'}_3+\overline{di/dt'}_4+\overline{di/dt'}_5)/5$, $\overline{di/dt''}_2=(\overline{di/dt'}_2+\overline{di/dt'}_3+\overline{di/dt'}_4+\overline{di/dt'}_5+\overline{di/dt'}_6)/5$, ..., $\overline{di/dt''}_n=(\overline{di/dt'}_{n-1}+\overline{di/dt'}_{n-2}+\overline{di/dt'}_{n-3}+\overline{di/dt'}_{n-4}+\overline{di/dt'}_n)/5$. In a similar way, the third sliding average calculation may further be performed based on this to obtain $\overline{di/dt'''}_1=(\overline{di/dt''}_1+\overline{di/dt''}_2+\overline{di/dt''}_3+\overline{di/dt''}_4+\overline{di/dt''})/5$, $\overline{di/dt'''}_2=(\overline{di/dt''}_2+\overline{di/dt''}_3+\overline{di/dt''}_4+\overline{di/dt''}_5+\overline{di/dt''}_6)/5$, ..., $\overline{di/dt'''}_n=(\overline{di/dt''}_{n-1}+\overline{di/dt''}_{n-2}+\overline{di/dt''}_{n-3}+\overline{di/dt''}_{n-4}+\overline{di/dt''}_n)/5$. The actual quantity of times of iteration may be considered with reference to a fluctuation condition and computation costs of an actual load. In this embodiment, N=3, that is, iteration is performed three times to obtain finally required average derivative values $\overline{di/dt'''}_1 \ldots \overline{di/dt'''}_n$.

If the value of N is 2, the iteration calculation is performed twice, that is, $\overline{di/dt''}_1 \ldots \overline{di/dt''}_n$ are taken as final results.

The embodiment in FIG. 10 is different from the first preferred embodiment under the concept of the present invention in that, in this embodiment, a step corresponding to step S400 in the first preferred embodiment may further include the following sub-steps.

S401: Determine time points corresponding to average values of two neighboring X-order derivatives, so as to determine a time t between calculating the average values of the two neighboring X-order derivatives.

S402: Use a method of dividing a difference between the average values of the two neighboring X-order derivatives by a difference between corresponding time points to calculate the (X+1)-order derivatives of the currents, that is, (X+1)-order derivatives $d^{n+1}i/dt_i=(\overline{d^n i/dt'''}_i-\overline{d^n i/dt'''}_{i-1})/t$, wherein t is a time difference between calculating $\overline{d^n i/dt'''}_i$ and calculating $\overline{d^n i/dt'''}_{i-1}$.

Figure 11:
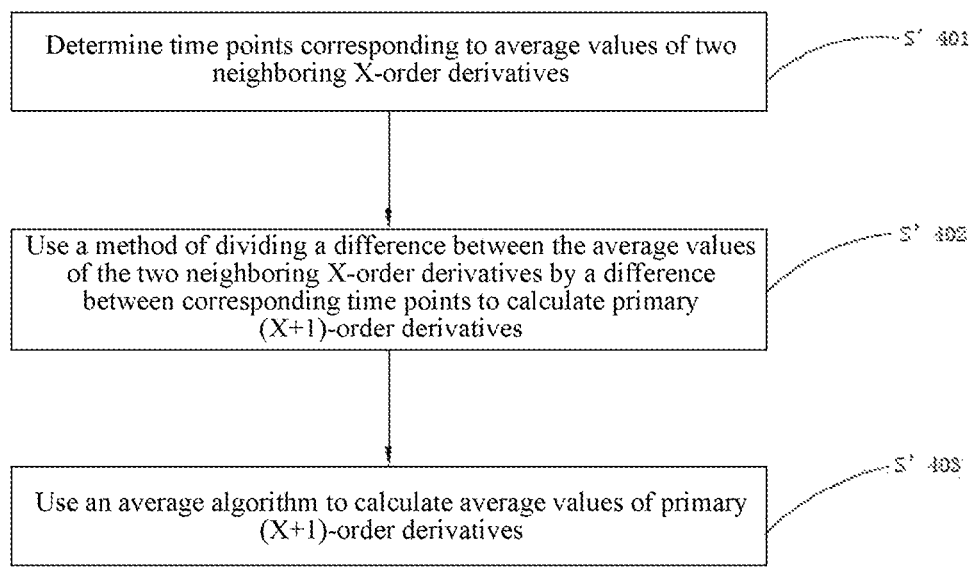
FIG. 11 is a preferred flowchart of calculating a value of a (X+1)-order derivative according to an embodiment under the second inventive concept of the present invention.

Optionally, as shown in FIG. 11, the values of the (X+1)-order derivatives may also be calculated by using a mean algorithm, that is, a step corresponding to step S400 in the foregoing embodiment may further include the following sub-steps.

S'401: Determine time points corresponding to average values of two neighboring X-order derivatives.

S'402: Use a method of dividing a difference between the average values of the two neighboring X-order derivatives by a difference between corresponding time points to calculate values of primary (X+1)-order derivatives of the currents. Steps S'401 and S'402 are the same as steps S401 and S402, and after a while, a plurality of primary (X+1)-order derivatives $d^{n+1}i/dt_1 \ldots d^{n+1}i/dt_n$ may be calculated.

S'403: Use an average algorithm to calculate average values of primary (X+1)-order derivatives. For example, one average value is calculated for every five values, and then $\overline{d^{n+1}i/dt}=(d^{n+1}i/dt_i+ \ldots +d^{n+1}i/dt_{i+4})/5$; and furthermore, one average value is calculated for every three values, and then $d^{n+1}i/dt=(d^{n+1}i/dt_i+ \ldots +d^{n+1}i/dt_{i+2})/3$.

In the foregoing preferred solution, the values of the (X+1)-order derivatives calculated at a plurality of time points are used to perform mean computation to obtain finally required values of (X+1)-order derivatives. The values of the (X+1)-order derivatives are closer to the actual working condition, and can enhance the accuracy of a following control operation of interrupting torque output of the electric tool. To enhance computation efficiency, during the process of calculating the average values of (X+1)-order derivatives, primary arithmetical average computation is preferably performed in this embodiment.

In the embodiment shown in FIG. 10, a step corresponding to step S500 in the foregoing embodiment may include the following sub-steps.

S501: Determine a high order derivative threshold and a triggering condition according to the load of the electric tool. The load may be a current power value or a current value of the electric motor, or another value of a parameter reflecting the output shaft load, or a current value calculated in the foregoing step. For example, $\overline{I}_j$ is an average current value at a certain time calculated in step S21 or S22 in the foregoing embodiment, and according to $\overline{I}_j$, a high order derivative threshold may be determined specifically in a table look-up manner. That is, a high order derivative threshold comparison table is preset, in which different average current value ranges correspond to different high order derivative thresholds. Then, a most suitable high order derivative threshold may be determined according to the actual working condition, so that a value of the counter may be modified more accurately, is closer to an actual working condition and further enhances the control efficiency of interrupting torque output.

The triggering condition in this embodiment is a condition related to a high-order derivative value. A person skilled in the art can understand that, the triggering condition of the electric tool usually is not a simple threshold comparison result obtained by one comparison, but a series of comparison results obtained by a plurality of continuous comparisons. Furthermore, for a different working condition, the triggering condition is also different. Therefore, there is a plurality of types of triggering conditions in the art, and the triggering condition, similar to the high-order derivative threshold, may also be determined according to a current load condition.

Furthermore, when the load of the electric tool is greater than the first load, the high order derivative threshold is determined as the first high order derivative threshold, and when the load of the electric tool is less than the first load, the high order derivative threshold is determined as the second high order derivative threshold. The second high order derivative threshold is less than the first high order derivative threshold. When the load is large, the high order derivative threshold is large, and when the load is small, the high order derivative threshold is small.

Furthermore, when the load of the electric tool is greater than the first load, the triggering condition is that the values of the (X+1)-order derivatives at the N continuous time points are all greater than the first high order derivative threshold. For example, the values $\overline{d^{n+1}i/dt}$ of the (X+1)-order derivatives on the five time points, i ms, (i+25) ms, (i+50) ms, (i+75) ms, and (i+100) ms are all greater than the high order derivative threshold, and then the torque output is interrupted.

When the load of the electric tool is less than the first load, the triggering condition is that the values of the (X+1)-order derivatives at the first M time points among N continuous time points are all greater than the second high order derivative threshold, and at least a part of the values of the (X+1)-order derivatives calculated at the latter N-M time points are less than the second high order derivative threshold. For example, the values of the (X+1)-order derivatives at the three time points i ms, (i+25) ms, and (i+75) ms are all greater than the high order derivative threshold, and the values of the (X+1)-order derivatives at the two time points (i+100) ms and (i+125) ms are both less than the high order derivative threshold, and then the torque output is interrupted.

The preferred solution sets different high order derivative thresholds and triggering conditions for interrupting torque output for different working conditions, so as to adapt to different working environments, thereby enhancing accuracy and efficiency of an automatic control operation.

The high order derivative thresholds preferably include at least three different high order derivative thresholds, and the triggering conditions corresponding to at least a part of different high order derivative thresholds are different. For example, three different high order derivative thresholds $d^{n+1}i/dt_x$, $d^{n+1}i/dt_y$, and $d^{n+1}i/dt_z$ are provided, $d^{n+1}i/dt_x$ may correspond to the first triggering condition, and $d^{n+1}i/dt_y$ and $d^{n+1}i/dt_z$ correspond to the second triggering condition. More preferably, three to nine different high order derivative thresholds are set according to different working conditions. When nine different high order derivative thresholds $d^{n+1}i/dt_1$-$d^{n+1}i/dt_9$ are set according to the load, $d^{n+1}i/dt_1$ and $d^{n+1}i/dt_2$ correspond to the same triggering conditions, $d^{n+1}i/dt_3$-$d^{n+1}i/dt_5$ correspond to the same triggering condition, $d^{n+1}i/dt_6$, $d^{n+1}i/dt_7$, $d^{n+1}i/dt_8$, and $d^{n+1}i/dt_9$ correspond to different triggering conditions respectively. Of course, other corresponding relations are also possible and will not be listed one by one herein.

S502: Compare the calculated values of N neighboring (X+1)-order derivatives with the high order derivative threshold respectively. For example, $\bar{d}^{n+1}i/dt=40$ at the $i^{th}$ ms after the electric motor begins to run, $\bar{d}^{n+1}i/dt=50$ at the $(i+25)^{th}$ ms, $\bar{d}^{n+1}i/dt=60$ at the $(i+50)^{th}$ ms, $\bar{d}^{n+1}i/dt=65$ at the $(i+75)^{th}$ ms, and $\bar{d}^{n+1}i/dt=70$ at the $(i+100)^{th}$ ms, relations between $\bar{d}^{n+1}i/dt$ and the high order derivative threshold are determined respectively at the five time points, i ms, (i+25) ms, (i+50) ms, (i+75) ms, and (i+100) ms. According to the plurality of $\bar{d}^{n+1}i/dt$, it can be known that the cycle for calculating the values of the (X+1)-order derivatives in this embodiments is 25 ms, that is, the average values of (X+1)-order derivatives are calculated every 25 ms. In other preferred manners, the calculation cycle may be determined according to hardware performance and actual demand. For example, 10 ms, 50 ms, or a shorter or longer calculation cycle is feasible, and the calculation cycle is not limited in the present invention.

S503: Determine whether a comparison result meets the triggering condition, and interrupt the torque output of the electric tool when the comparison result meets the triggering condition. After the high order derivative threshold is determined, in a series of comparisons as described above, the values of the (X+1)-order derivatives at some time points may be possibly greater than the high order derivative threshold and the values of the (X+1)-order derivatives at other time points may be possibly less than the high order derivative threshold, and the series of comparison results may form a comparison result change trend of the values of the (X+1)-order derivatives and thresholds, and if the change trend meets the triggering condition determined before, torque output is interrupted.

In a specific embodiment, a counter may be used to measure the change trend of the relation between the values of the (X+1)-order derivatives and the threshold. Specifically, after the values of the (X+1)-order derivatives are compared with the threshold, the value of the counter may be modified differently according to the comparison result. That is, the value of the counter are increased or decreased, and at the same time, the values of the counter at the foregoing five time points are recorded respectively.

It is assumed that $\bar{d}^{n+1}i/dt=40$ at the $i^{th}$ ms, $\bar{d}^{n+1}i/dt=50$ at the $(i+25)^{th}$ ms, $\bar{d}^{n+1}i/dt=60$ at the $(i+50)^{th}$ ms, $\bar{d}^{n+1}i/dt=65$ at the $(i+75)^{th}$ ms, $\bar{d}^{n+1}i/dt=70$ at the $(i+100)^{th}$ ms, the high order derivative threshold is 50, the initial value of the counter is 0, and the modification rule is to add 1 when the value of the (X+1)-order derivative is greater than 50, subtract 1 when the value of the (X+1)-order derivative is less than 50, and perform no subtraction when the value of the counter is 0. The values of the counter at the foregoing five time points are sequentially 0, 1, 2, 3, and 4, and it can be learned that the value of the counter is increased continuously, and then, the change trend of the value of the counter may be used as the foregoing triggering condition.

The present invention further provides a first preferred embodiment under a third inventive concept. This embodiment includes the following steps:

S100A: Obtain parameters of an electric tool during a running process. Refer to step S1 in the foregoing embodiment for details.

S200A: Calculate average current values according to a composite average algorithm. The composite average algorithm includes a combination of at least two average algorithms. Refer to steps S1, S21, and S22 in the foregoing embodiment for details.

S300A: Calculate values of first-order derivatives of the parameters according to the average values of the parameters. Refer to steps S3, S31, S32, S'31, S'32, and S'33 in the foregoing embodiment for details.

S400A: Calculate second-order derivatives according to the values of the first-order derivatives. The method for calculating second-order derivatives according to the first-order derivatives may be a difference method or a linear regression method. Refer to the description about relevant content in step S200 in the foregoing embodiment for details.

S500A: Interrupt torque output of the electric tool according to the second-order derivatives.

Optionally, this embodiment may further include step S402A: calculate (X+1)-order derivatives according to X-order derivatives. Correspondingly, step S500A is changed to interrupt torque output of the electric tool according to the (X+1)-order derivatives. The method for calculating (X+1)-order derivatives according to the X-order derivatives is the same as S400A except that the first-order derivatives in step S400A are replaced as the X-order derivatives, and at the same time, the second-order derivatives in step S400A are replaced as (X+1)-order derivatives.

In the foregoing embodiments, the control method, the control apparatus and the electric tool all determine a load condition of an output shaft of a current electric tool through obtaining current values of the electric tool during a running process, and perform a corresponding control according to a working condition reflected by the load condition. In other embodiments, the load condition of the output shaft of the current electric tool may also be obtained through obtaining various parameters of the electric motor of the electric tool during a running process, such as a rotation speed of the electric motor, a voltage of the electric motor, a voltage change of a power supply and a torque of an output shaft, and a corresponding control is performed according to a working condition reflected by the load condition. That is, the control method and the control apparatus provided by the present invention can also calculate average values of parameters characterizing an output shaft load according to the composite average algorithm through obtaining parameters characterizing the output shaft load, calculate the slope values according to the average values, and interrupt torque output of the electric tool according to the slope values, thereby realizing the purpose of the present invention. Accordingly, the electric tool includes a sensor configured to collect parameters characterizing the output shaft load.

Obviously, the embodiments are only to describe the examples clearly, instead of limiting the implementations. A person of ordinary skill in the art can further make other different forms of variations or modifications on the basis of the foregoing description. The implementations cannot be listed exhaustively herein, and the obvious variations or modifications still fall in the protection scope of the present invention.

The electric screwdriver is used as an example for description. Of course, the control method of the present invention may also be applied other electric tools, such as an electric drill and an electric spanner. The application may be implemented by a person of ordinary skill in the art easily according to the foregoing implementations, and will not be repeated by the applicant herein.

What is claimed is:

1. A control method for an electric tool, comprising the following steps:
    obtaining parameters characterizing an output shaft load during a running process of an electric tool;
    calculating average values of the parameters characterizing the output shaft load according to a composite average algorithm, wherein the composite average algorithm comprises a combination of at least two average algorithms;
    calculating slope values of the parameters characterizing the output shaft load according to the average values of the parameters characterizing the output shaft load;
    interrupting torque output of the electric tool according to the slope values of the parameters characterizing the output shaft load;
    wherein the step of interrupting torque output of the electric tool according to the slope values of the parameters characterizing the output shaft load comprises:
    determining a slope threshold and a triggering condition according to a load of the electric tool;
    comparing calculated slope values of N1 neighboring parameters characterizing the output shaft load with the slope threshold respectively; and
    determining whether a comparison result meets the triggering condition, and when the comparison result meets the triggering condition, interrupting torque output of the electric tool;
    wherein when the load of the electric tool is greater than a first load, the slope threshold is a first slope threshold, when the load of the electric tool is less than the first load, the slope threshold is a second slope threshold, and the second slope threshold is less than the first slope threshold; and
    wherein when the load of the electric tool is less than the first load, the triggering condition is that the slope values of the parameters characterizing the output shaft load calculated at first M time points among N2 continuous time points are all greater than the second slope threshold, and at least a part of the slope values of the parameters characterizing the output shaft load calculated at the latter N2−M time points are less than the second slope threshold.

2. The control method according to claim 1, wherein the composite average algorithm is a combination of an arithmetical average algorithm and a sliding average algorithm.

3. The control method according to claim 1, wherein the step of calculating average values of the parameters characterizing the output shaft load according to a composite average algorithm comprises:
    calculating average parameters of the parameters characterizing the output shaft load by using an arithmetical average algorithm; and
    calculating average values of the average parameters by using the sliding average algorithm.

4. The control method according to claim 3, wherein the step of calculating average values of the average parameters by using the sliding average algorithm specifically comprises: iterating calculation of average values of the average parameters for N times by using the sliding average algorithm, wherein N≥2, and a specific iteration operation is to take a result of previous average computation as a data source of next average computation.

5. The method according to claim 1, wherein the step of calculating slope values of the parameters characterizing the output shaft load according to the average values of the parameters characterizing the output shaft load comprises:
    determining time points corresponding to the average values of two neighboring parameters characterizing the output shaft load;
    calculating primary slope values of the parameters characterizing the output shaft load by using a method of dividing a difference between the average values of the two neighboring parameters characterizing the output shaft load by a difference between the corresponding time points; and
    calculating average slope values of the primary slope values by using an average algorithm.

6. The method according to claim 1, wherein when the load of the electric tool is greater than the first load, and the triggering condition is that the slope values of the parameters characterizing the output shaft load calculated at the N2 continuous time points are all greater than the first slope threshold.

7. The method according to claim 1, wherein the slope thresholds comprise at least three different slope thresholds, and the triggering conditions corresponding to at least a part of the different slope thresholds are not the same.

8. A control apparatus for an electric tool, comprising:
    an obtaining unit, configured to obtain parameters characterizing an output shaft load during a running process of an electric tool;
    an average parameter calculation unit, configured to calculate average values of the parameters characterizing the output shaft load according to a composite average algorithm, wherein the composite average algorithm comprises a combination of at least two average algorithms;
    a slope value calculation unit, configured to calculate slope values of the parameters characterizing the output shaft load according to the average values of the parameters characterizing the output shaft load;
    an execution unit, configured to interrupt torque output of the electric tool according to the slope values of the parameters characterizing the output shaft load;
    wherein the execution unit comprises:
    an execution condition setting unit, configured to determine a slope threshold and a triggering condition according to a load of the electric tool;
    a slope comparison unit, configured to compare the calculated slope values of N1 neighboring parameters characterizing the output shaft load with the slope threshold respectively; and
    a judging unit, configured to determine whether a comparison result meets the triggering condition, and interrupt torque output of the electric tool when the comparison result meets the triggering condition;
    wherein when the load of the electric tool is greater than a first load, the slope threshold is a first slope threshold, when the load of the electric tool is less than the first load, the slope threshold is a second slope threshold, and the second slope threshold is less than the first slope threshold; and wherein when the load of the electric tool is less than the first load, the triggering condition is that the slope values of the parameters characterizing the output shaft load calculated at first M time points among N2 continuous time points are all greater than the second slope threshold, and at least a part of the slope values of the parameters characterizing the output shaft load calculated at the latter N2−M time points are less than the second slope threshold.

9. The apparatus according to claim 8, wherein the composite average algorithm is a combination of an arithmetical average algorithm and a sliding average algorithm.

10. The apparatus according to claim 8, wherein the average parameter calculation unit comprises:
an arithmetical average calculation unit, configured to calculate average parameters of the parameters characterizing the output shaft load by using an arithmetical average algorithm; and
a sliding average calculation unit, configured to calculate average values of average parameters by using a sliding average algorithm.

11. The apparatus according to claim 10, wherein the steps of calculating average values of average parameters by using a sliding average algorithm specifically comprises: iterating calculation of the average values of the average parameters for N times by using the sliding average algorithm, wherein N≥2, and a specific iteration operation is to take a result of previous average computation as a data source of next average computation.

12. The apparatus according to claim 8, wherein the slope value calculation unit comprises:
a time determining unit, configured to determine time points corresponding to the average values of two neighboring parameters characterizing the output shaft load;
a difference calculation unit, configured to calculate primary slope values of the parameters characterizing the output shaft load by using a method of dividing a difference between the average values of the two neighboring parameters characterizing the output shaft load by a difference between the corresponding time points; and
an average slope value calculation unit, configured to calculate average slope values of the primary slope values by using the average algorithm.

13. The apparatus according to claim 8, wherein when the load of the electric tool is greater than the first load, the triggering condition is that the slope values of the parameters characterizing the output shaft load calculated at the N2 continuous time points are all greater than the first slope threshold.

14. The apparatus according to claim 8, wherein the slope thresholds comprise at least three different slope thresholds, and the triggering conditions corresponding to at least a part of the different slope thresholds are not the same.

15. An electric tool having the control apparatus for an electric tool according to claim 13, wherein the electric tool includes an electric motor and an output shaft, wherein the electric motor is configured to drive the output shaft to move, wherein the electric tool further comprises:
a parameter collection unit, configured to collect parameters characterizing an output shaft load during a running process of the electric motor.

16. The electric tool according to claim 15, further comprising:
a mode setting apparatus, configured to set working modes of the electric motor;
wherein the control apparatus controls the electric motor in a predetermined working mode.

17. The electric tool according to claim 16, wherein the working modes comprise at least a drilling mode and a screwdriver mode, wherein the screwdriver mode is used as the predetermined working mode.

18. The electric tool according to claim 16, wherein the mode setting apparatus comprises:
a key unit, configured to receive a user operation; and
a mode selection unit, configured to set the working mode of the electric motor according to the user operation.

* * * * *